(12) United States Patent
Torrenegra et al.

(10) Patent No.: US 8,266,011 B2
(45) Date of Patent: Sep. 11, 2012

(54) METHOD, SYSTEM AND APPARATUS FOR MATCHING SELLERS TO A BUYER OVER A NETWORK AND FOR MANAGING RELATED INFORMATION

(75) Inventors: Alex Henriquez Torrenegra, Secaucus, NJ (US); Tania Zapata, Secaucus, NJ (US)

(73) Assignee: Torrenegra IP, LLC, Secaucus, NJ (US)

( * ) Notice: Subject to any disclaimer, the term of this patent is extended or adjusted under 35 U.S.C. 154(b) by 0 days.

(21) Appl. No.: 13/271,675

(22) Filed: Oct. 12, 2011

(65) Prior Publication Data

US 2012/0030052 A1 Feb. 2, 2012

Related U.S. Application Data

(63) Continuation of application No. 11/780,553, filed on Jul. 20, 2007, now abandoned.

(60) Provisional application No. 60/832,042, filed on Jul. 20, 2006.

(51) Int. Cl.
*G06Q 30/00* (2006.01)

(52) U.S. Cl. .................. 705/26.4; 705/26.3; 705/27.1; 705/37

(58) Field of Classification Search .................. 705/26, 705/27, 37
See application file for complete search history.

(56) References Cited

U.S. PATENT DOCUMENTS

| | | |
|---|---|---|
| 5,164,897 A | 11/1992 | Clark et al. |
| 5,243,515 A | 9/1993 | Lee |
| 5,592,375 A | 1/1997 | Salmon et al. |
| 5,615,269 A | 3/1997 | Micali |
| 5,710,887 A | 1/1998 | Chelliah et al. |
| 5,717,989 A | 2/1998 | Tozzoli et al. |
| 5,754,850 A | 5/1998 | Janssen |
| 5,758,328 A | 5/1998 | Giovannoli |
| 5,794,207 A | 8/1998 | Walker et al. |
| 5,832,452 A | 11/1998 | Schneider et al. |
| 5,835,896 A | 11/1998 | Fisher et al. |
| 5,842,178 A | 11/1998 | Giovannoli |
| 5,890,138 A | 3/1999 | Godin et al. |
| 5,966,699 A | 10/1999 | Zandi |
| 6,014,639 A | 1/2000 | Fohn et al. |
| 6,085,169 A | 7/2000 | Walker et al. |

(Continued)

OTHER PUBLICATIONS

Grikscheit, Alyssa A: "Buying and selling when the going gets tougher," Mergers and Acquisition, May/Jun. 1999; Proquest # 42289777, 8 pgs.*

(Continued)

*Primary Examiner* — Robert M. Pond
(74) *Attorney, Agent, or Firm* — Gordon & Jacobson, PC

(57) ABSTRACT

A method and system for facilitating a transaction between a buyer and one of a number of sellers is provided. The transaction is related to a project specified by the buyer. A set of sellers is identified. A flow control process operates over a number of successive processing cycles. In each processing cycle, sellers are selected from the set for classification as sellers of a particular type ("Invited Sellers"). The Invited Sellers increase incrementally over the number of successive processing cycles. The system automatically enables at least one action carried out by the Invited Sellers in each processing cycle. The duration of the processing cycles can vary. The number of Invited Sellers selected in each processing cycle can vary. In one embodiment, the number of Invited Sellers selected in each processing cycle depends upon a number of offers that are submitted by Invited Sellers and received by the buyer.

22 Claims, 17 Drawing Sheets

U.S. PATENT DOCUMENTS

| | | | |
|---|---|---|---|
| 6,131,087 A | 10/2000 | Luke et al. | |
| 6,189,003 B1 | 2/2001 | Leal | |
| 6,236,990 B1 | 5/2001 | Geller et al. | |
| 6,243,691 B1 | 6/2001 | Fisher et al. | |
| 6,356,878 B1 | 3/2002 | Walker et al. | |
| 6,356,909 B1 | 3/2002 | Spencer | |
| 6,385,594 B1 | 5/2002 | Lebda et al. | |
| 6,397,197 B1 | 5/2002 | Gindlesperger | |
| 6,418,415 B1 | 7/2002 | Walker et al. | |
| 6,567,784 B2 | 5/2003 | Bukow | |
| 6,574,608 B1 | 6/2003 | Dahod et al. | |
| 6,584,462 B2 | 6/2003 | Neal et al. | |
| 6,611,816 B2 | 8/2003 | Lebda et al. | |
| 6,647,373 B1 | 11/2003 | Carlton-Foss | |
| 6,687,682 B1 | 2/2004 | Esfandiari et al. | |
| 6,751,597 B1 | 6/2004 | Brodsky et al. | |
| 6,826,541 B1 | 11/2004 | Johnsont et al. | |
| 6,871,191 B1 | 3/2005 | Kinney, Jr. et al. | |
| 6,876,973 B1 | 4/2005 | Visconti | |
| 6,937,996 B1 | 8/2005 | Forsythe et al. | |
| 6,965,868 B1 | 11/2005 | Bednarek | |
| 6,965,877 B2 | 11/2005 | Banerjee et al. | |
| 6,983,276 B2 | 1/2006 | Tenorio | |
| 6,993,503 B1 | 1/2006 | Heissenbuttel et al. | |
| 7,024,376 B1 | 4/2006 | Yuen | |
| 7,058,602 B1 | 6/2006 | La Mura et al. | |
| 7,069,242 B1 | 6/2006 | Sheth et al. | |
| 7,072,857 B1 | 7/2006 | Calonge | |
| 7,085,732 B2 | 8/2006 | Gould | |
| 7,087,829 B2 | 8/2006 | Hasegawa et al. | |
| 7,096,193 B1 | 8/2006 | Beaudoin et al. | |
| 7,103,568 B1 | 9/2006 | Fusz et al. | |
| 7,107,226 B1 | 9/2006 | Cassidy et al. | |
| 7,110,976 B2 | 9/2006 | Heimermann et al. | |
| 7,130,815 B1 | 10/2006 | Gupta | |
| 7,167,855 B1 | 1/2007 | Koenig | |
| 7,222,116 B2 | 5/2007 | Bello et al. | |
| 7,249,027 B1 | 7/2007 | Ausubel | |
| 7,266,523 B2 | 9/2007 | Depura et al. | |
| 7,272,579 B1 | 9/2007 | Canali et al. | |
| 7,302,404 B2 | 11/2007 | Solomon | |
| 7,302,429 B1 | 11/2007 | Wanker | |
| 7,305,363 B1 | 12/2007 | Sandholm et al. | |
| 7,324,969 B2 | 1/2008 | Pallister et al. | |
| 7,330,826 B1 | 2/2008 | Porat et al. | |
| 7,330,829 B1 | 2/2008 | Tenorio | |
| 7,330,852 B2 | 2/2008 | Bailey et al. | |
| 2001/0032170 A1 | 10/2001 | Sheth | |
| 2001/0032175 A1 | 10/2001 | Holden et al. | |
| 2001/0044758 A1 | 11/2001 | Talib et al. | |
| 2001/0047323 A1 | 11/2001 | Schmidt | |
| 2002/0013735 A1 | 1/2002 | Arora et al. | |
| 2002/0023046 A1 | 2/2002 | Callahan et al. | |
| 2002/0038285 A1 | 3/2002 | Golden et al. | |
| 2002/0069154 A1 | 6/2002 | Fields | |
| 2002/0147674 A1 | 10/2002 | Gillman | |
| 2002/0152133 A1 | 10/2002 | King et al. | |
| 2002/0156857 A1 | 10/2002 | Brewer et al. | |
| 2002/0161697 A1 | 10/2002 | Stephens et al. | |
| 2003/0004854 A1 | 1/2003 | Greene et al. | |
| 2003/0014326 A1 | 1/2003 | Ben-Meir et al. | |
| 2003/0018566 A1 | 1/2003 | Mackay et al. | |
| 2003/0023537 A1* | 1/2003 | Joshi et al. | 705/37 |
| 2003/0028469 A1 | 2/2003 | Bergman et al. | |
| 2003/0033239 A1 | 2/2003 | Gilbert et al. | |
| 2003/0041010 A1 | 2/2003 | Yonao-Cowan | |
| 2003/0093355 A1 | 5/2003 | Issa | |
| 2003/0101127 A1 | 5/2003 | Cornelius | |
| 2003/0200168 A1 | 10/2003 | Cullen, III et al. | |
| 2003/0204448 A1 | 10/2003 | Vishik et al. | |
| 2003/0208434 A1 | 11/2003 | Posner | |
| 2003/0208435 A1 | 11/2003 | Posner | |
| 2003/0225683 A1 | 12/2003 | Hill et al. | |
| 2004/0030569 A1 | 2/2004 | Elgrably | |
| 2004/0073507 A1 | 4/2004 | Scott et al. | |
| 2004/0215467 A1 | 10/2004 | Coffman et al. | |
| 2005/0033682 A1 | 2/2005 | Levy et al. | |
| 2005/0055299 A1 | 3/2005 | Chambers et al. | |
| 2005/0131724 A1 | 6/2005 | Clay | |
| 2005/0131799 A1 | 6/2005 | Clay et al. | |
| 2005/0149410 A1 | 7/2005 | Livesay | |
| 2005/0182660 A1 | 8/2005 | Henley | |
| 2005/0182743 A1 | 8/2005 | Koenig | |
| 2005/0203806 A1 | 9/2005 | Jacobs et al. | |
| 2005/0228709 A1 | 10/2005 | Segal | |
| 2005/0246240 A1 | 11/2005 | Padilla | |
| 2006/0074890 A1 | 4/2006 | Sundharam | |
| 2006/0080207 A1 | 4/2006 | Girija et al. | |
| 2006/0085318 A1 | 4/2006 | Cohoon | |
| 2006/0095366 A1 | 5/2006 | Sheth et al. | |
| 2006/0106636 A1 | 5/2006 | Segal | |
| 2006/0106712 A1 | 5/2006 | Guo et al. | |
| 2006/0136324 A1 | 6/2006 | Barry et al. | |
| 2006/0149653 A1 | 7/2006 | Davis et al. | |
| 2006/0218052 A1 | 9/2006 | Haynes et al. | |

OTHER PUBLICATIONS

Department of Justice. Justice Department Settles Airlines Price Fixing Suit, May save Consumers Hundreds of Millions of Dollars. Press Release, Mar. 17, 1994.

Hotwire, Hotwire Chooses Best of Breed Technology Partners, Aug. 1, 2000.

Auction Blocks: Criminals Unload Counterfeit and Stolen Goods on eBay, Scalet, Sarah D., CSO Online, Aug. 1, 2005.

Airline Tariff Publishing Company, Wikipedia, originally downloaded Apr. 15, 2008.

Computer Reservations System, Wikipedia, originally downloaded Apr. 15, 2008.

Online Auction Business Model, Wikipedia, originally downloaded Apr. 15, 2008.

Priceline.com, Wikipedia, originally downloaded Apr. 15, 2008.

Travel Search Engine, Wikipedia, originally downloaded Apr. 15, 2008.

* cited by examiner

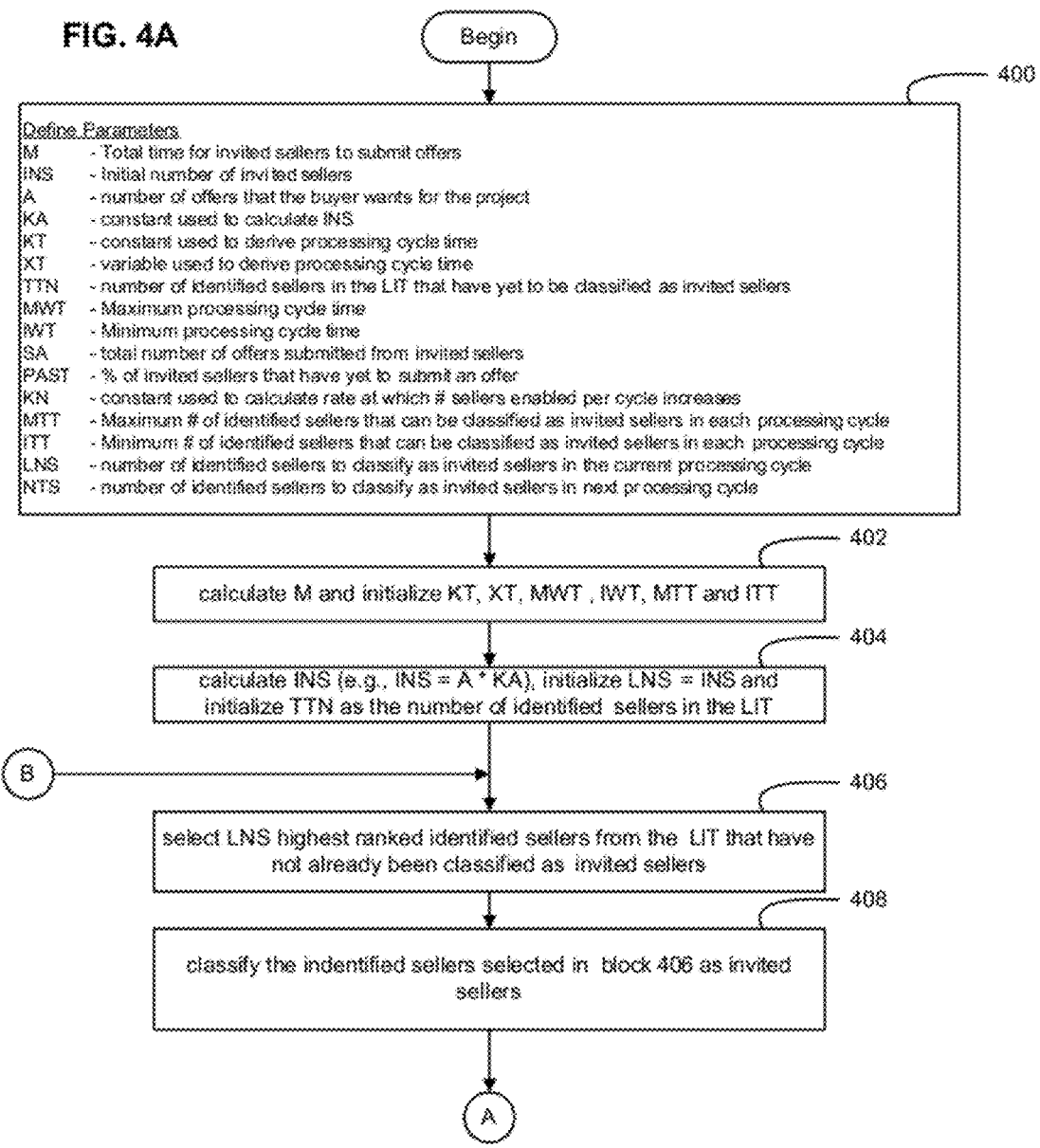

FIG. 5A1

Voice123 is the leading voice over marketplace. Find voice overs the fast, easy way! Voiceover talents: register for free.

Voice|1|2|3®
the voice marketplace™

*Customer Service*
*(by email, chat & phone)*

*Ideas? Comments?*
*Please let us know*

You are signed in as vs200@test.torrenegra.com
Sign Out

| My Home | Post a Project-FREE! | Search Our Talent Database | My Projects & Auditions | My Preferred Voices |

Project Creation Form

You can use this form to create a project in Voice123. If you need assistance, you can contact us via phone, online chat or email. Please keep in mind the following:

Check Out the Guide to Hiring Voice Talents and Voice Producers Online

- If you don't know what to anwer to any question, don't worry. Voice 123 will figure it out.
- By default, your contact information is fully protected. We will not reveal it to talents or voice producers and won't ever sell it. Your privacy is vital to us.

What happens after you complete this form?

— 501

Please assign a short name to your project*:
Please avoid using the name of your company.

Would you like *Voice|1|2|3* Smart•Cast® to invite talents of voice producers to submit auditions or proposals for your project (while keeping your pricacy)? You can always invite the talents and voice producers directly.

— 503                — 505

◉ Yes, I would like *Voice|1|2|3* Smart•Cast® to invite talents of voice producers (HIGHLY RECOMMENDED!)

○ No, I only want the talents or voice producers that I invite to submit auditions or proposals for the project.

Approximately how many auditions or proposals would you like to receive from talents or voice producers invited by *Voice|1|2|3* Smart•Cast®?

— 507
[ 25 ⇅ ] auditions and/or proposals

— 509

What is the purpose of the recording?:  511A  [--- Select One --- ⇅]

Would you prefer a female or a male voice?:
511B  ☐ Female Voice
      ☐ Male Voice In which language should the talent(s) be fluent?:  — 513
[---Select One --- ⇅]  ( Add More )

What voice age(s) you would like the talent(s) to use?
:
515  ☐ Child
     ☐ Teen
     ☐ Young Adult
     ☐ Middle Age
     ☐ Senior How would you like the audio to be recorded and delivered?:
517  ☐ ISDN
     ☐ MP3/WAVE/AIFF
     ☐ CD Overnight
     ☐ Phone Patch

FIG. 5A2

☐ Ftp

Which union status do you require the talent(s) to have?:
519 {
☐ AFTRA
☐ SAG
☐ EQUITY
☐ ACTRA
☐ Non Union or Financial Core Would you like to hide the name of your company to talents and voice producers invited by (Voice 1 2 3) Smart•Cast®?
⦿ No ○ Yes
521

Do you have file attachments for this project that you would like us to see?
○ Yes ⦿ No
523
525

Please provide a description of your project (the more detailed, the better)*

527

If you want talents or voice producers to submit auditions, please provide a short script:

How is the budget you have for this project?
(need help determining a budget? - new window)
⦿ Flexible  ○ Fixed  ○ To be defined
529

What budget do you have in mind?
(please use only digits avoiding symbols, dot, and commas)
[USD ▼] [_____] 531

What is your deadline for auditions or proposals?  533 { [📅 07/09/2007] [21:00 ▼]
[(GMT +09:00) Osako, Sapporo, Tokyo ▼]

[Create Project] — 535
By using Voice123 you accept our Terms of Service

FIG. 5B

Voice123 is the leading voice over marketplace. Find voice overs the fast, easy way! Voiceover talents: register for free.

Voice 1 2 3®
the voice marketplace™

| Customer Service (by email, chat & phone) | Ideas? Comments? Please let us know |

You are signed in as vs200@test.torrenegra.com
Sign Out

My Home   Post a Project-FREE!   Search Our Talent Database   My Projects & Auditions   My Preferred Voices Invite Talents or Producers to Project LTK9201614814X You have the following options for inviting talents and voice producers to submit auditions or proposals for your project:

541

| Increase the Voice123 SmartCast® limits | Increase to more than 200 the number of auditions or proposals that you are willing to receive as a result of Voice123 SmartCast® invitations. |

543

| Invite your own talents to participate on the project | Simply tell them to go to http://voice123.com/1v/LTK9201614814X.html and use the following verification code when asked: A38F98 |

545

| Search our database and invite talents or voice producers | You can invite as many talents and voice producers as you want to submit auditions or proposals for your project. |

| Invite Talents or Voice Producers from My Preferred Voices List | If you haven't used "My Preferred Voices" feature, this would be a great time to learn about it! |

 VeriSign Secured         TRUSTe

Add to:   delicious   Digg   Yahoo   Shadows

Voice Over Savvy Forums | The Voice123 Blog | Talent Directory | Industry Directory | Project Directory
Affiliate Program | Terms of Use | Privacy Policy | Please Link to Us | Contact Us 130 7th Ave #303, New York, NY, 10011 | © 2007 Voice123, LLC. All rights reserved | Patents Pending
Voice123 - Voice Overs | Language123 - Translation Services | Casting123 - Actors & Models

FIG. 5C

Voice123 is the leading voice over marketplace. Find voice overs the fast, easy way! Voiceover talents: register for free.

Voice 1 2 3®
the voice marketplace™

*Customer Service*
*(by email, chat & phone)*

*Ideas? Comments?*
*Please let us know*

You are signed in as talent101@test.torrenegra.com
Switch to the Voice-Seeker Interface | Sign Out My Home | Invitation Inbox & Audition Outbox | My Profile | My Subscription | Search Our Talent Database | Additional Tools

Contact Alex Torrenegra

⚠ IMPORTANT: The message to which you are trying to reply was sent asking you to submit an audition and/or proposal for the project LTK9202108803X. Please click here to submit an audition and/or proposal on it. Replying to project invitations using this form is NOT recommended. Please use this form only if you have questions about the project that you feel you MUST ask.

Contact Via Email

You can use this form to send an email message to Alex Torrenegra. The recipient of this message will be able to reply to you using a similar form in Voice123. Please note that in order to maintain your privacy, your email and phone number will not be visible to the recipient unless you write them in the remarks. You name will be visible.

From:  Talent 101
       If you are not talent101@test. torrenegra.com, please sign out.

To:    Alex Torrenegra

*Subject:  Re:Voice Seeker Invitation - Project "SmartCast® Test"

*Remarks:  From: Alex Torrenegra via Voice123
           Sent:Jun 30, 2007 2:35 AM GMT
           To: Talent 101
           Subject: Voice Seeker Invitation - Project "SmartCast® Test"

Hi Talent,

I would like to invite you to participate in the project "SmartCast® Test"
           I posted at Voice123.
           To see the details of the project and then submit an audition and/or
           proposal, you can use the following link:

http://st.voice123.com/lv/5801643.html----

Attachment:  [Choose File] no file selected
             (You can send attachments of up to 2Mb)

☐ Send me a copy of this message to my email address

[Submit Form]

FREE!!!

Manage projects

• You can create a project and invite talents to participate in it.
• Get dozens of auditions and quotes in minutes.
• All of the auditions and quotes are organized in Voice123.
• You can grade, store, download, and share the auditions you get.
• You can create private projects when secrecy is important.
       Try it today!
[Create a Project]

| | | Peter Mason<br>♀ (Add to My Preferred Voices) | | | EUR 23423 | | Jun 14, 2007<br>21:54:36 | +Details |
|---|---|---|---|---|---|---|---|---|
| ☐ | ⌂ | Ronnie Gonzalez<br>♀ (Add to My Preferred Voices) | | | EUR 24323 | | Jun 12, 2007<br>21:34:11 | +Details |
| ☐ | ⌂ | Dudley Craig<br>♀ (Add to My Preferred Voices) | | | USD 32423423 | | Jun 12, 2007<br>21:33:15 | +Details |
| ☐ | ⌂ | Mitch Phillips<br>♀ (Add to My Preferred Voices) | | | USD 32423423 | | Jun 12, 2007<br>21:27:25 | +Details |
| ☐ | ⌂ | Tanya Saracho<br>♀ (Ad My Preferred Voices) | | | GBP 456456 | | Jun 10, 2007<br>20:03:26 | +Details |
| ☐ | ⌂ | Talent 101<br>♀ Preferred Voice (Remove) | | | USD 7895 | | Jun 10, 2007<br>08:32:58 | +Details |

⇧ ( Delete ) ( +Details )

⊕ Increase the Number of Auditions/Proposals  Voice123 Smart·Cast® Will Seek
◐ Extended Project Deadline - Reopen Project
⊙ Extend Audio Storage Time

 VeriSign Secured     TRUSTe

Add to:  delicious  Digg  Yahoo  Furl  Shadows

Voice Over Savvy Forums | The Voice123 Blog | Talent Directory | Industry Directory | Project Directory
Affiliate Program | Terms of Use | Privacy Policy | Please Link to Us | Contact Us 130 7th Ave #303, New York, NY, 10011 | © 2007 Voice123, LLC. All rights reserved | Patents Pending
Voice123 - Voice Overs | Language123 - Translation Services | Casting123 - Actors & Models

FIG. 6A mhtmlmain: 7/2/07 7:59 AM

Voice 1 2 3®
*the voice marketplace*™   Sign In | Contact Us | Please Link to Us Hello Alex, This is an automated invitation generated by Voice123 SmartCast® for you to participate in the project "Beta Web Audio Project" (LTK9201797573X).

To see the details of this project and determine if you should submit an audition and/or proposal or not, please go to:

http://st.voice123.com/lv/Beta_Web_Audio_Project.html

Please Read This:

It is very important for you to be highly selective of the projects for which you audition. The more selective you are, the higher the chances of having a good experience using Voice123. There are three main reasons for this:

First Reason: Voice123 SmartCast® takes into account many factors to determine what talents and voice producers can participate in a project and when. As good as it may be, Voice123 SmartCast® is an automated system. Every now and then it may fail to do a proper match of your profile to any given project. As such, you may get invitations to participate in projects that don't match your profile. Please make sure the project REALLY matches your voice over skills and delivery capabilities before you submit an audition and/or proposal to it.

Second Reason: Voice123 SmartCast® gives higher priority to talents and voice producers that are selective. If you submit auditions and/or proposals to most of the invitations you get, Voice123 SmartCast® may infer that you are not properly filtering the invitations. As a consequesnce, Voice123 SmartCast® will send you fewer invitations. Please note, however, that if you consider that you should submit an audition and/or proposal to a project, you should do it as quickly as you can to avoid Voice123 SmartCast® from inferring that you are too slow submitting auditions and/or proposals.

Third Reason: Voice Seekers can grade your auditions and proposals. If you submit auditions and/or proposals to projects that don't properly match your voice over skills and delivery capabilitites, you may get bad grading from the voice seeker. If you get too many bad grades, Voice123 SmartCast® may not invite you to new projects.

You can learn more about the way Voice123 SmartCast®works. Simply go to http://voice123.com/doc/smartcast.html The Voice123 Team Please do not reply to this message as your reply would not be read. To contact us via email please use the form located at
http://voice123.com/web/common/contact_us.ogi If you want to stop getting messages similar to this, please go to
http://st.voice123.com/web/common/o.cgi?k=woZx6Nh_a._2K2WF4CjLTEUGK If you find our service useful, please link to us:
http://about.voice123.com/voice/content/please_link_to_us Suggestions about the usability and texts of this page?

Voice123 | All rights reserved | © 2007
130 7th Avenue #303, New York, NY, 10011 | Phone: 1877-275-8642 mhtmlmain:

FIG. 6B1

Voice123 is the leading voice over marketplace. Find voice overs the fast, easy way! Voiceover talents: register for free.
Other Popular Searches: San Diego Character Voice Over Demo | William Morris Agency Voice Talent Wendy Kay Gray | Pittsburgh Talent Agencies Voice | Voice Over Talent Charlotte North Carolina | Recording Phone Conversions

Voice 1 2 3®
*the voice marketplace*™

Customer Service
*(by email, chat & phone)*

Ideas? Comments?
*Please let us know*

You are signed in as alex@test.torrenegra.com
Switch to the Voice-Seeker Interface | Sign Out My Home | Invitation Inbox & Audition Outbox | My Profile | My Subscription | Search Our Talent Database | Additional Tools

Beta Web Audio Project

This page contains the most important details of this project. If you find the information on this project inaccurate or inappropriate, please let us know by contacting us.

( Modify Audition or Proposal to this Project ) ( Rate this Project ) ( Invitation Inbox )

Project Main Details

| | |
|---|---|
| Project Name: | Beta Web Audio Project |
| Project ID: | LTK9201797573X |
| Project Description: (Please note that Voice123 screens all projects before approving them, but does not proofread the project name, description, or script provided by the voice seeker) | Web audio PSA - site intro message. Dry, uncompressed wav or aiff file. We will mix with music bed.<br><br>Compassionate but not plodding; slightly upbeat. You should be thinking as you read the script that people can make a positive difference.<br><br>Thank you for participating in this audtion. |
| Posted: | Jun 22, 2007 11:19:49 (GMT -05:00) Eastern Time (US & Canada) |
| Deadline: | Jul 04, 2007 09:00:00 (GMT -05:00) Eastern Time (US & Canada) |
| Voice 1 2 3 Smart•Cast® Enabled: | Yes (click here to learn more about Voice 1 2 3 Smart•Cast®) |
| Project Status: | Opened and receiving Voice 1 2 3 Smart•Cast® auditions and/or proposals |
| Auditions/Proposals Received: | 9 |

Project Parameters

| | |
|---|---|
| Geographical Requirements: | None |
| Budget: | Flexible - USD 150 |
| Purpose of the Recording: | Commercials and promos for radio, TV, Internet, and related media. |
| Language Requirements: | English (American) |
| Voice Genders: | Female or Male |

FIG. 6B2

| Voice Ages: | Middle Age |
| --- | --- |
| Delivery Requirements: | MP3/WAVE/AIFF |
| Union Requirements: | Non Union or Financial Core |

Script Details

| Custom Demo Required: | Yes |
| --- | --- |
| Script Notes: | N/A |
| Script: | CHILDREN SHOULD BE FREE TO PLAY, FREE TO BE ALIVE, FREE TO BE A CHILD. It really is that simple.<br><br>The issue of slavery is a social, political and economic issue. Help make a difference. Join the Not for Sale Campaign. Learn more at Not for Sale Campaign Dot Org. |

Voice-Seeker Details

| Voice Seeker ID: | 15582 |
| --- | --- |
| Company Name: | Hidden as per voice seeker's request (why?) |
| Registered with Voice123 Since: | Jun 21, 2007 |
| Projects Created in Voice123: | 3 |
| Messages and Direct Invitations Sent Via Voice123: | 1 |

Click here to learn more about this voice seeker

Voice123 Team Comments
- A Voice123 Team member DID NOT talk over the phone to this voice-seeker about this project.
- A Voice123 Team member DID NOT talk over the phone to this voice-seeker about other projects he/she has created.
- A Voice123 Team member DID NOT communicate via email with this voice-seeker about this project.
- A Voice123 Team member DID NOT communicate via email with this voice-seeker about other projects he/she has created.
- Voice123 WAS NOT able to find a corporate web site for this voice seeker.

Note: Although Voice123 tries to establish the legitimacy of all projects posted, you are responsible for conducting your own investigation into any and all claims made by prospective voice seekers, agents and/or clients. You assume all liability for use of any information you find through Voice123, LLC, or any of its publications.

  

Add to:  delicious  Digg     Yahoo     Furl    Shadows

FIG. 6C1

BRAND IT OR BLOW IT.  BRAINTRACKSAUDIO.COM

Voice 1 2 3®
*the voice marketplace* ™

Customer Service
(by email, chat & phone)

Ideas? Comments?
Please let us know

You are signed in as talent101@test.torrenegra.com
Switch to the Voice-Seeker interface | Sign Out My Home | Invitation Inbox & Audition Outbox | My Profile | My Subscription | Search Our Talent Database | Additional Tools

Submit Audition and/or Proposal for Project LTK9201614814X

⚠ This form is time sensitive. Please make sure you submit it as soon as possible to reduce the chances of having the project closed while you complete it.

⚠ Remember: You were invited to participate in this project by *Voice123* Smart•Cast.® The voice seeker may not have heard your voice in the past.

You can submit your audition and/or quote using this interface. Please make sure you read it thoroughly as all details are very important.

Audition/Proposal Form

*\*Generic Related Demo*

You must attach a demo featuring one or more sample of recordings you have done for similar projects. That way the voice seeker will have more tools for selecting the best voice for the project. You can upload a new demo or select one from the list of demos you have in your Voice123 profile.

○ I want to use one of the demos I have in my Voice123 profile.

○ I want to upload a new file.

*\*Price Quote*

• Please state the full price you would charge for this project.

• Please make sure the price is comprehensive and meets all the criteria listed by the voice seeker for his/her project.

• Please avoid using currency symbols, dots, or commas.

• If you need to provide additional information about your pricing, please use the remarks area.

• When setting a price, please bear in mind that if you quote high, your chances of being invited to partcipate in projects with high budgets increase but will diminish for projects with low budjets. If you quote low, the opposite happens (check the industry averages for non-union

Project Details
Click here to see more details about this project (new window)

☐ Project Main Details

| Project Name: | Project Management Test 1001 |
|---|---|
| Project ID: | LTK9201614814X |

Project Description:
Project Management Test 1001 Project Management Test 1001 Project Management Test 1001 Project Management Test 1001 Project Management Test 1001 Project Management Test 1001 Project Management Test 1001 Project Management Test 1001 Project Management Test 1001

| Posted: | Jun 16, 2007 15:24:26 (GMT +09:00) Osako, Sapporo, Tokyo |
|---|---|
| Deadline: | Jul 16, 2007 23:00:00 (GMT +09:00) Osako, Sapporo, Tokyo |
| *Voice123* Smart•Cast® Enabled: | Yes |
| Status: | Extended and receiving *Voice123* Smart•Cast® auditions and/or proposals |
| Auditions/Proposals Received: | 0 |

☐ Project Parameters

| Geographic Requirements: | None |
|---|---|
| Budget: | To be defined |
| Purpose of the Recording: | Commercials and promos for radio, TV, Internet, and related media. |
| Language Requirements: | English (American) |

FIG. 6C2

METHOD, SYSTEM AND APPARATUS FOR MATCHING SELLERS TO A BUYER OVER A NETWORK AND FOR MANAGING RELATED INFORMATION

CROSS-REFERENCE TO RELATED APPLICATIONS

This application is a continuation of U.S. patent application Ser. No. 11/780,553, filed Jul. 20, 2007 now abandoned, which claims benefits from U.S. Provisional Patent Application No. 60/832,042, filed Jul. 20, 2006, the contents of which are both herein incorporated by reference in their entireties.

BACKGROUND OF THE INVENTION

1. Field of the Invention

This invention relates broadly to methods, systems and apparatus for facilitating electronic commerce. More particularly, this invention relates to methods, systems and apparatus for matching buyers and sellers of goods and services.

2. State of the Art

Electronic commerce systems (such as online marketplaces, online auction houses, online reverse auction houses) provide a mechanism for matching sellers with buyers for facilitating transactions related to goods and services. For reverse auctions, there can be a significant number of potential sellers that can meet the demands of a respective buyer. This unbalance can have negative effects such as:

too much competition among sellers;

an overflow of offers submitted from sellers to a respective buyer and a low conversion ratio of acceptance of such offers by buyers;

a reduced quality of offers submitted from sellers to a respective buyer; and a perception by the sellers who submit offers that the lowest priced offer will be accepted by the buyer.

Electronic commerce systems proposed in the prior art (for example, the system described in U.S. Pat. No. 6,647,373 to Carlton-Foss) facilitate reverse auctions for goods and/or services, yet fail to address the problems that arise from the unbalance as set forth above, where there are a significant number of potential sellers that can meet the demands of a respective buyer, and where there are other factors apart from price (such as quality of the service or product offered by the seller, reputation of the seller, etc.) that may affect the decision of the buyer. In such situations, the buyer can receive an overwhelming number of offers, which makes it difficult and time-consuming to identify the most appropriate seller. It also makes it unpractical for sellers as they have to compete with a large number of other sellers, which significantly reduces the conversion ratio of accepted offers by sellers. Such reduced conversion ratios can negatively impact the reverse auction process as sellers spend time and effort preparing and submitting offers that are rejected by buyers, which can deflate the moral of the sellers and lower the quality of the offers submitted by sellers to buyers as part of the process.

Several commercially-available online systems (such as elance.com and guru.com) have attempted to address these issues by limiting the number of offers sellers can make based on a tier system and/or by terminating the offer submission process when a certain number of offers have been submitted to the buyer. These systems are limited in their benefit to a buyer because the matching process favors sellers that submit offers quickly and does not attempt to aid the buyer in receiving better suited offers for the desired goods and/or services.

Thus, there remains a need in the art for improved methods, systems and apparatus for facilitating electronic commerce involving matching buyers and sellers of good and services, and particularly where such matching is part of a reverse auction process.

SUMMARY OF THE INVENTION

It is therefore an object of the invention to provide improved methods, systems and apparatus for facilitating electronic commerce involving matching buyers and sellers of good and services.

It is another object of the invention to provide such methods, systems and apparatus where matching of buyers and sellers is part of a reverse auction process.

It is a further object of the invention to provide such matching process that is effective when there are a significant number of potential sellers that can meet the demands of a respective buyer.

It is also an object of the invention to provide such matching process that is effective when there are other factors apart from price (such as quality of the service or product offered by the seller, reputation of the seller, etc.) that may affect the decision of the buyer.

In accord with these objects, which will be discussed in detail below, an improved system and method for facilitating a transaction between a buyer and one of a number of sellers is provided. The transaction is related to a project specified by the buyer. A set of sellers are identified from a database. A flow control process operates over a number of processing cycles. In each processing cycle, the flow control process selects sellers from the set for classification as sellers of a particular type ("Invited Sellers"). The system automatically enables at least one action carried out by the sellers of the particular type.

In the illustrative embodiment, the duration of the processing cycles varies over the processing cycles and is derived from a time period specified by the buyer as well as a predetermined constant that results in exponential reduction of the process cycle durations. The number of sellers selected for classification as sellers of a particular type also varies over processing cycles and depends upon a number of offers that are submitted by sellers of the particular type and received by the buyer. In the initial processing cycle, the number of sellers selected for classification as sellers of a particular type depends on a number of offers the buyer wishes to receive as dictated by input from the buyer.

In a preferred embodiment, the at least one action enabled by the process includes: i) the sellers of the particular type submitting offers and information related to the offers and storing the offers and related information (such as multimedia files) in a database for access by the buyer; ii) the sellers of the particular type accessing detailed information related to the offer; iii) communication between the sellers of the particular type and the buyer; iv) automatic notification to the sellers of the particular type of their classification to the particular type; and/or v) automatic notification to the buyer of the sellers of the particular type.

In the preferred embodiment, the selection of the sellers of the set is carried out by calculating likelihood indices for the sellers of the set, and ranking the sellers of the set according to the corresponding likelihood indices. This allows the selection process to select higher ranked sellers before lower ranked sellers. The likelihood index for a seller are preferably derived from a number of index calculations, most preferably including a group of relevancy subindices and a group of priority subindices. The sellers of the set are preferably identified by an automated process that matches requirements of the project as specified by the buyer to profile data of sellers.

Additional objects and advantages of the invention will become apparent to those skilled in the art upon reference to the detailed description taken in conjunction with the provided figures.

BRIEF DESCRIPTION OF THE DRAWINGS

FIGS. 4A and 4B, collectively, is a flow chart illustrating the flow control process of FIG. 2 for classifying Invited Sellers over a number of processing cycles for a project in accordance with the present invention.

FIGS. 5A1, 5A2, 5B, 5C, 5D1 and 5D2 illustrate an exemplary user interface generated by the system of FIG. 1 for creating and managing projects and perform related tasks where voice over talent or producers provide voiceovers to buyers for commercial needs.

FIGS. 6A, 6B1, 6B2, 6C1 and 6C2 illustrate an exemplary user interface generated by the system of FIG. 1 that allows voice over talent and produces (a Seller) to submit and manage offer(s) and perform related tasks for Buyers' project(s) that are matched to the Seller by the system.

DETAILED DESCRIPTION OF THE PREFERRED EMBODIMENTS

For purposes of description herein, a "reverse auction" is a process whereby a number of sellers compete for the right to provide goods or services to a buyer. The reverse auction is different from an "ordinary auction," which is process whereby a number of buyers compete for the right to obtain goods or services from a seller.

Figure 1:
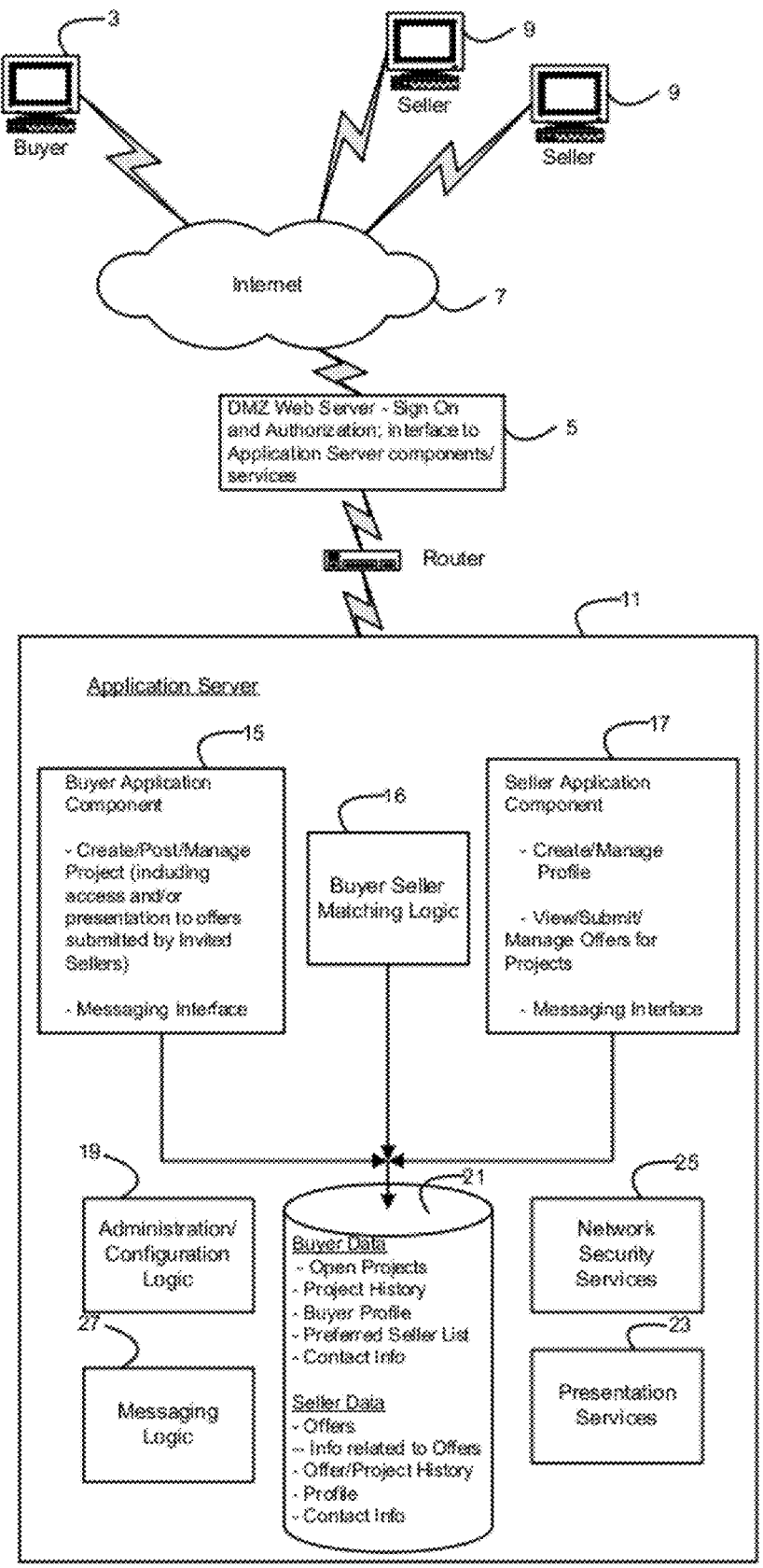
FIG. 1 is a block diagram of an electronic commerce system that includes functionality for matching buyers and sellers of good and services in accordance with the present invention.

Turning now to FIG. 1, there is shown the architecture of an electronic commerce system that facilitates reverse auctions. There are two classes (denoted "Buyers" and "Sellers") of users of the system. One or more Buyers access the system over a network (such as the Internet) to create and manage projects. A project is a solicitation for goods and/or services that are desired by the Buyer. Sellers of the system compete for the right to provide goods or services to a Buyer as dictated by a corresponding project. In the illustrative embodiment, a project involves a number of requirements, such as one or more dates related to the project (e.g., a start date and/or an end date) and specific needs or functions to be provided by the Seller to the Buyer. Sellers access the system over the network to create and maintain a profile stored on the system. The system includes software logic that automatically matches a number of Sellers to a given Buyer's project that is posted or otherwise designated by the given Buyer. The system also provides for creation, submission and management of offers related to a given Buyer's project by Sellers that are matched to the given Buyer's project. A Seller is matched to a given Buyer's project by classifying the Seller as an Invited Seller for this project as described below in more detail. The system also provides for communication and management of such offers between Buyers and Sellers in order to facilitate transactions therebetween.

As shown in FIG. 1, a Buyer utilizes a web browser executing on a computing device 3 to connect to a web server 5 over the network 7 (e.g., Internet). Similarly, a number of Sellers each utilize a web browser executing on a computing device 9 to connect to the web server 5 over the network 7. Preferably, the browser-based interaction between the computing devices 3, 5 and the web server 5 occur over TCP/IP sessions established therebetween over which are communicated HTML-based (and possibly XML-based) documents and commands as well as other messages, commands and data. The web server 5 enables login and authentication of the Buyer via interaction with the Buyer system 3 as well as login and authentication of a respective Seller via interaction with the Seller system 9. Such login and authentication can utilize password-based authentication, operating system-based authentication (e.g., NTLM or Kerberos); services-based authentication (e.g., Microsoft Passport authentication), certificate-based authentication, or any other authentication scheme. Once a user session has been authorized (whether it be a Buyer session or Seller session), the web server 5 communicates with an Application Server 11 to build dynamic web page(s) based on data supplied by the Application Server 11 and serve the dynamic web page(s) to the Buyer web browser (or the Seller web browser) as requested, and forward (and/or transform) data supplied by the Buyer web browser (or the Seller web browser) to the Application Server 11 as needed. Preferably, the web server 5 is located in a "demilitarized zone" (DMZ) provided with a firewall router 13. In this configuration, the firewall/router 13 enables authorized communication between the web server 5 and the Application Server 11 (typically utilizing a secure socket layer (SSL) interface or an IPSec interface), while blocking unauthorized communication requests to the Application Server 11. In addition, the web server 5 preferably utilizes style sheets to build the HTML documents (and XML documents) for presentment to the Buyer web browser (or to the Seller web browse). The web server 5 may be realized by commercially available HTTP servers, such as the Apache Web Server, Microsoft Internet Information Server, and Sun ONE Web Server.

The Application Server 11 includes a Buyer Application Component 15, a Seller Application Component 17, Buyer Seller Matching Logic 16, Administration/Configuration Logic 19, a Database 21 storing buyer data and seller data, Presentation Services 23, Network Security Services 25, and Messaging Logic/Services 27. The Administration/Configuration Logic 19 provides for system management and configuration of the Application Server 11. The Presentation Services 23 are facilities that enable delivering dynamic content to client browsers. Preferably, the Presentation Services 23 support Active Server Pages, JavaServer pages, server-side scripting such as Perl, CGI, PL/SQL scripting, etc. The Network Security Services 25 provides facilities that enable maintaining network security (such as SSL-based or IPSec-based encryption and authentication facilities). Preferably, the Application Server 11 is realized by a commercially-available software framework, such as the WebLogic Platform commercially available from BEA Systems of San Jose, Calif., the Websphere Application Server commercially available from IBM, Windows Server Systems commercially available from Microsoft Corporation of Redmond, Wash., or the SUN ONE Application Server commercially available from Sun Microsystems of Santa Clara, Calif.

The Database 21 maintains buyer data that pertains to a respective Buyer and to the projects of the respective Buyer as well as seller data that pertains to a respective Seller and to the offers of the respective Seller. In the illustrative embodiment shown, the buyer data pertaining to a respective Buyer can include data defining open projects, project history, profile of the respective Buyer, a preferred seller list, contact information for the respective Buyer, etc. The seller data pertaining to a respective Seller can include defining offers to which the respective seller has been matched (i.e., offers for which the Seller is classified as an Invited Seller), information related to such offers, offer/project history, profile of the respective Seller, contact information for the respective Seller, etc.

The Buyer Application component 15, works in conjunction with the Presentation Services 23 and other components of the Application Server 11, to provide dynamic content to the web server 5 for delivery to the browser-based Buyer system 3. The Buyer Application component 15 also encodes logic that allows for the respective Buyer to create and manage projects and store information pertaining thereto in the Database 21, which preferably includes access to and/or presentation of offers submitted by Invited Sellers for the projects of the respective Buyer as well as information provided by the Seller related thereto.

FIGS. 5A1, 5A2, 5B, 5C, 5D1 and 5D2 depict an exemplary user interface generated by the Buyer Application component 15 for creating and managing projects where voice over talent or producers provide voiceovers to buyers for commercial needs. The user interface is communicated to and rendered by the buyer system 3 by operation of a web browser executing on the buyer system 3.

Figure 2:
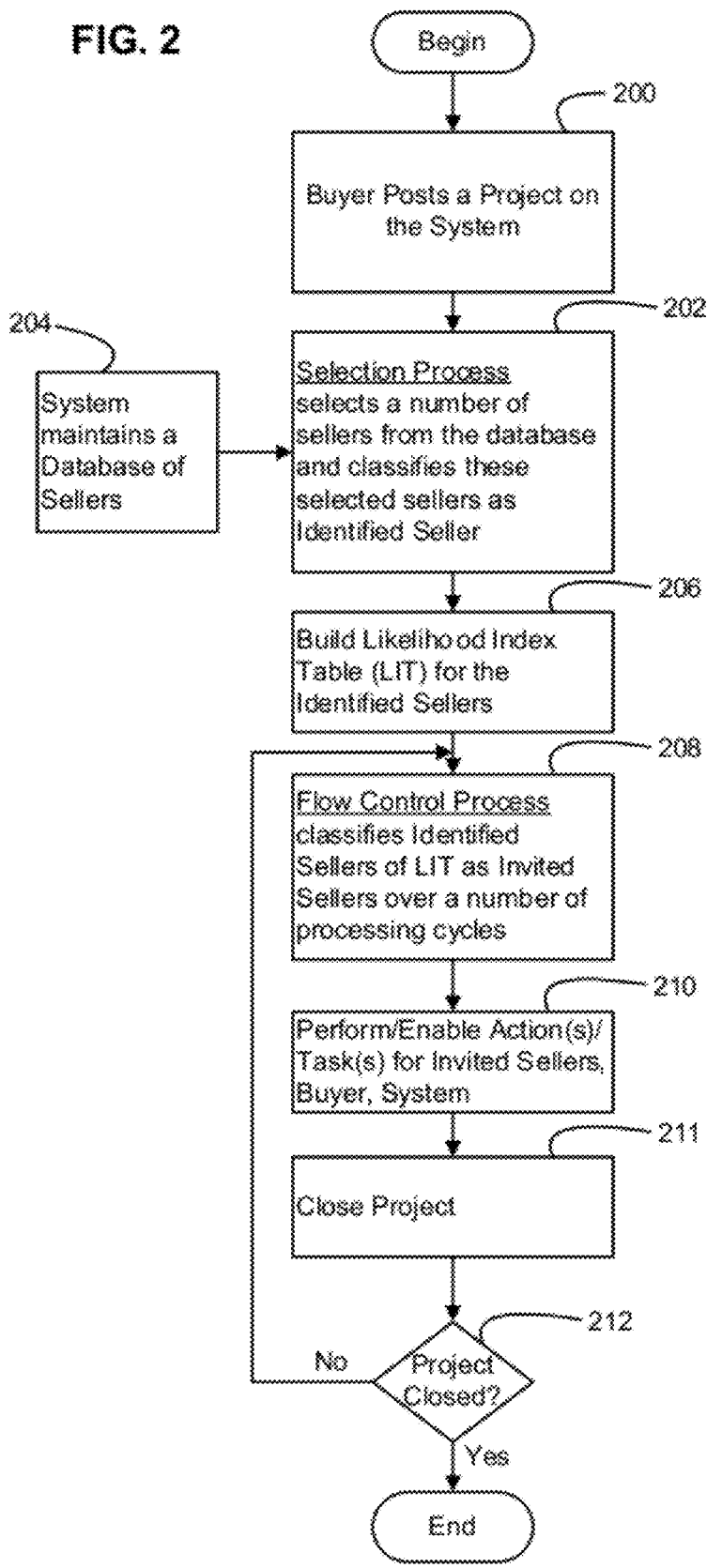
FIG. 2 is a flow chart illustrating the operations of the matching functionality of the electronic commerce system of FIG. 1 in accordance with the present invention.

FIGS. 5A1 and 5A2, collectively, illustrate a user interface generated by the Buyer Application component 15 for creating a project, including a text box 501 for assigning a name to the project, buttons 503, 505 for selectively activating and deactivating the Buyer Seller Matching logic 16 described below for the project, a widget 507 for specifying the number of offers that the Buyer would like to receive for the project, a pull down box 509 to enable the Buyer to specify the purpose of the project, buttons 511A, 511B that allows the Buyer to specify a preference for a female or male voice, a pull down menu 513 that allows the Buyer to specify the language fluency requirements for the project, a set of buttons 515 that allows the Buyer to specify the voice age for the project, a set of buttons 517 that allows the Buyer to specify the audio recording format and delivery mechanism for the project, a set of buttons 519 that allows the Buyer to specify any union requirements for the project, buttons 521 that allow the Buyer to selectively hide the name of the Buyer's company to sellers for the project, buttons 523 that allow the Buyer to selectively attach files for the project, a text input box 525 that allows the Buyer to provide a description of the project, a text input box 527 that allows the Buyer to provide a script for an audition for the project, a set of buttons 529 and an input box 531 that allows the Buyer to describe the budget for the project, a date/time input widget 533 that allows the Buyer to define a date and time deadline for the project, and a button 535 that is selected by the Buyer to commit storage of the project data as defined by the user input in the Database 21 of the system.

FIG. 5B illustrates a user interface generated by the Buyer Application component 15 for managing a project, including a selector box 541 that enables the Buyer to navigate to a user interface (not shown) for increasing the number of offers that the Buyer wishes to receive for a project, a display field 543 that provides the Buyer with instructions on how to invite sellers that are not part of the system to access the project on the system (preferably, such sellers access the project by a URL and access code that is specified in the display field 543), a selector box 545 that enables the Buyer to navigate to a user interface (not shown) for searching for sellers of the system as maintained in the Database 21 and for inviting selected sellers to submit an offer for the project, and a selector box 547 that enables the Buyer to navigate to a user interface (not shown) for inviting sellers that are on the Buyer's Preferred Seller List (as maintained in the Database 21) to submit an offer for the project.

Figure 5D1:
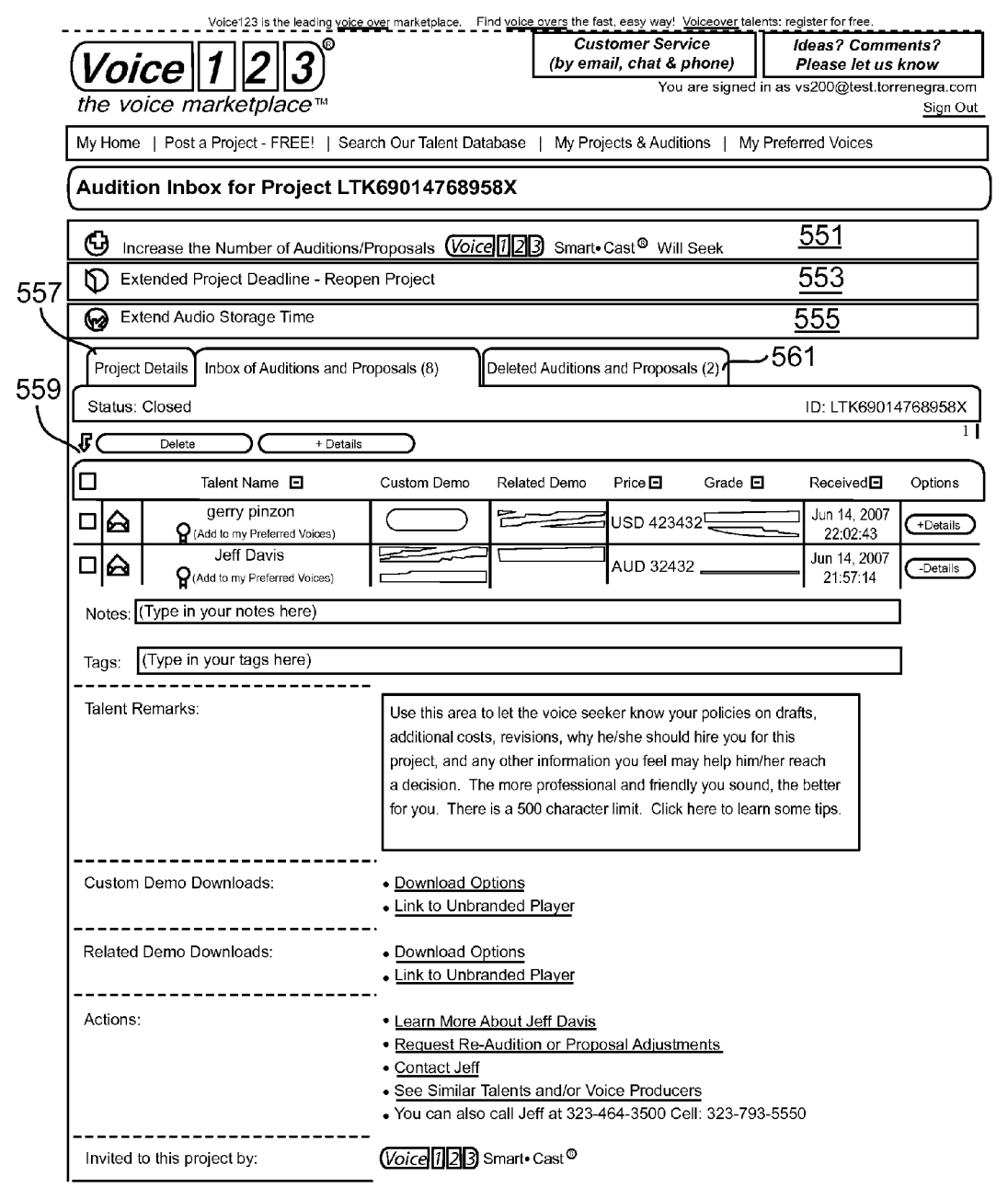

FIGS. 5D1 and 5D2, collectively, illustrate a user interface generated by the Buyer Application component 15 for managing a project, including selector box 551 that enables the Buyer to navigate to a user interface (not shown) for increasing the number of offers that the Buyer wishes to receive for a project, a selector box 553 that enables the Buyer to navigate to a user interface (not shown) for updating the deadline of (or reopening) the project, a selector box 555 that enables the Buyer to navigate to a user interface (not shown) for extending audio storage time for the project, a tabbed folder including a project detail tab 557, an inbox tab 559 that provides the Buyer with access to the offers submitted by Invited Sellers (including the display of status information related to the offers and performing various actions related thereto as shown), and a deleted tab 561 that provides the Buyer with access to offers deleted by the Buyer.

The Buyer Seller Matching Logic 16 works in conjunction with the other components of the Application Server 11 to match a number of Sellers to a given Buyer's project that is posted or otherwise designated by the given Buyer. A Seller is matched to a given Buyer's project by classifying the Seller as an Invited Seller for this project as described below in more detail.

The Seller Application component 17, works in conjunction with the Presentation Services 23 and other components of the Application Server 11, to provide dynamic content to the web server 5 for delivery to the browser-based Seller system 9. The Seller Application component 17 also encodes logic that allows Sellers to create and maintain profiles (short description of goods or services, training, additional skills, experience, description of goods or services, historical price data for projects, desired buyer preferences, project matching filter data, etc.), which are stored in the Database 21. The Seller Application component 17 also enables the Seller to perform various actions with regard to project(s) that are matched to the Seller (such as creation, submission and management of offers related to a given Buyer's project).

FIGS. 6A, 6B1, 6B2, 6C1, and 6C2 depict an exemplary user interface generated by the Seller Application component 17 that allows voice over talent or producers (Voice Over Seller) to perform various actions with regard to project(s) that are matched to the Voice Over Seller by the Matching Logic 16. The user interface is communicated to and rendered by the seller system 9 by operation of a web browser executing on the seller system 9. The Database 21 maintains a profile for each Voice Over Seller, which specifies one or more of the following: i) one or more languages that the Voice Over Seller is fluent in, ii) types of projects that the Voice Over Seller is interested in pursing, iii) one or more voice ages that can be provided by the Voice Over Seller, iv) audio format and delivery options provided by the Voice Over Seller, v) one or more union affiliations of the Voice Over Seller, v) a description of the Voice Over Seller's voice, vi) a description of the experience of the Voice Over Seller, vii) training of the Voice Over Seller, viii) additional skills of the Voice Over Seller, ix) contact information for the Voice Over Seller, x) means for initiating payment to the Voice Over Seller, xi) one or more audio files for demonstrating the voice over skills of the Voice Over Seller, xii) historical price data for projects, xiii) desired buyer preferences, and xiv) project matching filter data.

FIG. 6A illustrates a user interface generated by the Seller Application component 17 for notifying a Voice Over Seller that the Voice Over Seller has been matched to a Buyer's project by the Buyer Seller Matching Logic 16 as described herein. The notification is automatically generated by the system and triggered by the classification of the Voice Over Seller as an Invited Seller as described herein.

FIGS. 6B1 and 6B2, collectively, illustrate a user interface generated by the Seller Application component 17 that allows the Voice Over Seller to view the details of a project that the Voice Over Seller has been matched to. The project details include a description of the project, the date the project was posted, the deadline for the project, project status (opened and receiving offers or closed), how many offers received, geographical requirements for the project, budget information, language requirements for the project, voice gender for the project, voice age for the project, audio recording and delivery requirements for the project, union requirements for the project, script information for the project, voice seeker (Buyer) details for the project, etc.

Figure 6C2:
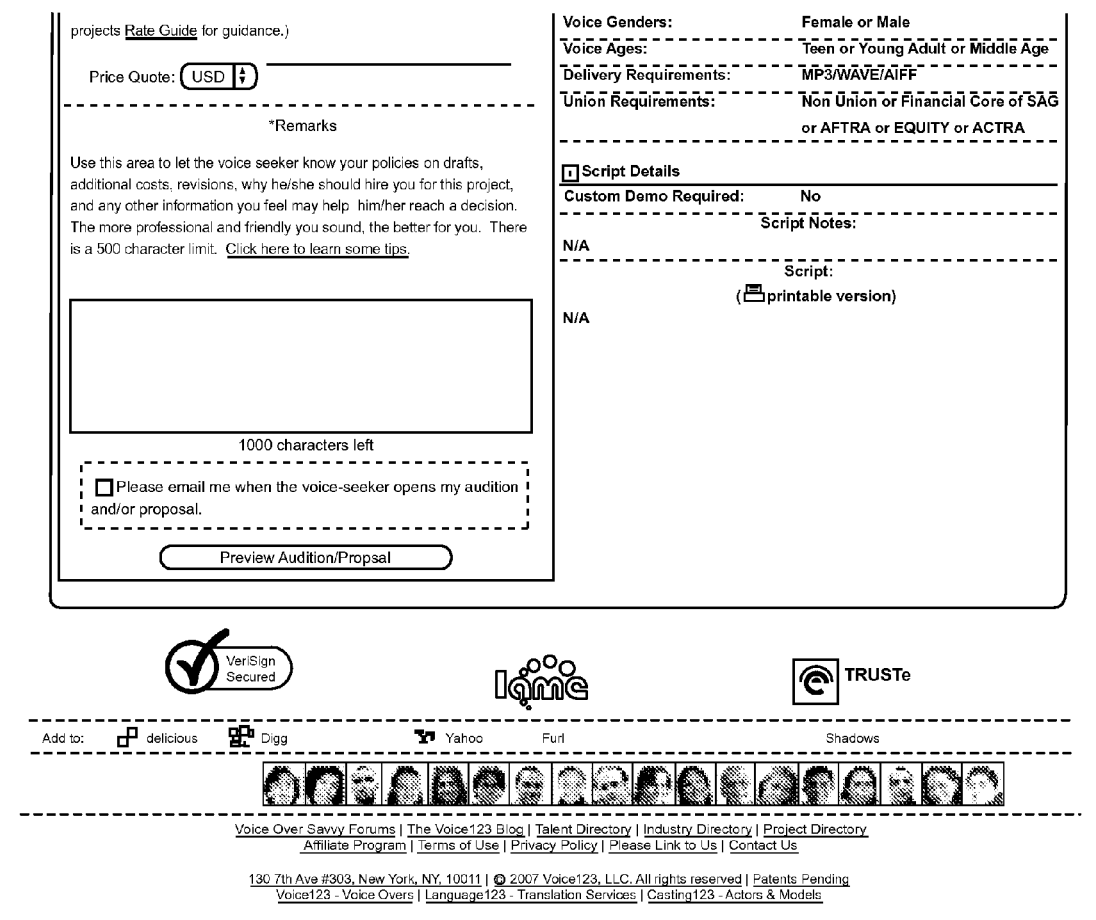

FIGS. 6C1 and 6C2, collectively, illustrate a user interface generated by the Seller Application component 17 that allows the Voice Over Seller to create and submit an offer for a project that the Voice Over Seller has been matched to. The interface enables the Voice Over Seller to upload an audio file as part of the offer (e.g., for an audition or other demonstration purposes), specify the price of the project, and provide other relevant information as shown. The interface also includes a button that allows the Voice Over Seller to request notification if and when the Buyer of the project opens the offer and/or information related thereto as shown. The interface also provides detailed information regarding the project as shown. This interface is presented to the Voice Over Seller for a given Project only in the case where the Voice Over Seller is classified as an Invited Seller for the given project as described herein.

The Buyer and Seller Application components 15, 17 also include functionality (e.g., a messaging interface) that provides for communication between Buyers and Sellers in order to facilitate transactions therebetween. Messaging logic/services 27 provided by the Application Server 11 can be used to carry out such communication. The Messaging logic/services 27 can support voicemail for voice messages, email messaging, IM messaging, SMS messaging or other suitable communication services between Buyers and Sellers. FIG. 5C illustrates a user interface generated by the Buyer Application component 15 that allows a Buyer to communicate an invitation to submit an offer for a project. Similar interfaces can be used for other communication from the Buyer to a Seller and from a Seller to a Buyer in order to facilitate matching a Seller to a Buyer, for collaboration therebetween on projects, for arranging payment between the Buyer and Seller, etc.

Turning now to FIG. 2, there is shown a high-level schematic representation of the functions provided by the Buyer Seller Matching Logic 16. Such functions begin in block 200 upon a Buyer creating and posting a project (P) on the system. At block 202, a selection process is carried out in which a number of sellers are selected from the Database 21 (block 204) based on the Sellers profiles stored therein as matched against the requirements of the project (P) as stored therein. These Sellers are classified as "Identified Sellers." The selection process of block 204 can be rigid in nature (e.g., requiring that the Seller's profiles match all of the requirements of the project) or can be more flexible in nature based on similarity between the Sellers profiles and the requirements of the project (P). A weighted-tree similarity algorithm or other suitable matching algorithm can be used for the similarity-based matching.

Figure 3:
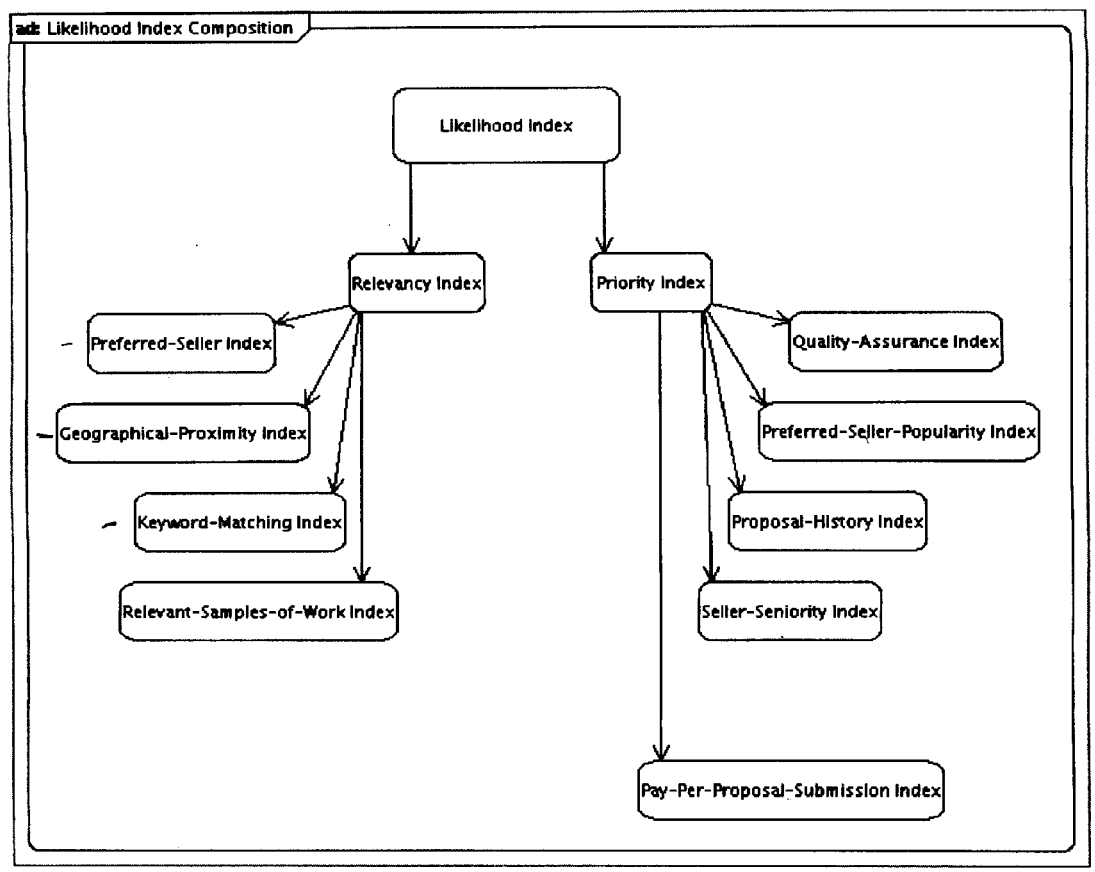
FIG. 3 is a schematic illustration of an index schema that can be used in the operations of FIG. 2 for determining a likelihood (or probability) that an offer from a Seller will best match a Buyer's project in accordance with the present invention.

At block 206, a likelihood index table (LIT) is built for the Identified Sellers selected in block 202. The LIT includes a likelihood index (LI) for each Identified Seller. The LI represents the likelihood (or probability) that an offer from the Identified Seller will best match the Buyer's project (P). It can also account for the level of activity of Sellers in the marketplace (in order to first invite more or less active Sellers) and/or account for other factors that the marketplace may consider (in order to increase or decrease the level of participation of individual Sellers). The LI for an Identified Seller can be calculated using numerous factors, each of which is accorded a different weight based on an individual buyer's needs. Different markets will likely require different factors to use in the calculation, and a Buyer can assign relative weights to the factors if desired. In an illustrative embodiment, the LI for an Identified Seller is derived from relevancy and priority indices as described below in more detail (FIG. 3). The Identified Seller with the highest LI is predicted to have the greatest chance of being matched to the Buyer for the project (P). The LIT ranks the Identified Sellers by their LIs from highest LI to lowest LI. In other words, the Identified Seller(s) having the highest LI are ranked first in the LIT and the Identified Seller(s) with the lowest LI are ranked last in the LIT.

At block 208, a flow control process (FCP) is carried out to regulate the process and flow by which the Buyer receives offers from Identified Sellers for the project (P). The FCP is intended to increase the Buyer's chances of finding the best matching Identified Seller for the project (P) at the beginning of the process. The FCP classifies Identified Sellers in the LIT as "Invited Sellers" over a number of processing cycles. In each processing cycle, the FCP calculates a new number of Identified Sellers to classify as "invited." The number of Invited Sellers classified and the time period calculated for each processing cycle is strategically determined in order to make the most efficient use of the Buyer's time in finding a Seller for the project. The process by which these parameters are calculated during each processing cycle is further discussed below, and illustrated by FIGS. 4A and 4B.

At block 210, the system automatically performs various system tasks related to the project, and enables actions and/or tasks to be performed by the Invited Sellers and/or the Buyer of the project (P). These tasks/actions include, but are not limited to, notifying the Invited Seller that he or she has been selected to submit one or more offers to the Buyer; notifying the Buyer of the Invited Seller; allowing communication between the Invited Seller and Buyer; allowing the Invited Seller to submit an offer to the Buyer; and additional information exchanges.

At block 211, the process determines if the project should be closed. Projects can be closed for several reasons. For example, the project can close automatically upon expiration of the last processing cycle of the flow control process of block 208. In another example, the Buyer can designate a number of offers that the Buyer wants to receive during the process. The system can track the number of offers that the Buyer receives during the process and close the process when the tracked number of received offers matches the number of wanted offers designated by the Buyer. In other examples, the project can be closed when the deadline for receiving offers has passed; the Buyer has already selected a Seller; the Buyer opted to stop receiving offers before the original deadline; etc. If closed, the project could be reopened at any time upon the Buyer's request, thus restarting or reactivating the process.

At block 212, the system determines whether the project (P) has been closed. If the project (P) has not yet closed, the system returns to block 208 to continue the FCP process. If the project has closed, the system can automatically perform various system tasks related to the project before it ends. Such system tasks can include:

(1) notification to Invited Seller(s) that the project has closed (which can be accomplished by the mechanisms discussed above);

(2) notification to the Buyer that the project has closed (which can be accomplished by the mechanisms discussed above);

(3) disabling communication between the Invited Seller(s) and Buyer (which can be accomplished by the mechanisms discussed above);

(4) disabling submission of offers and/or information related thereto from the Invited Seller(s) to the Buyer (which can be accomplished by the mechanisms discussed above);

(5) disabling access to detailed information regarding the project by the Invited Seller(s) (which can be accomplished by the mechanisms discussed above); and (6) disabling exchange of information between the Buyer and the Invited Seller(s) as desired (which can be accomplished by the mechanisms discussed above).

As described above, a likelihood index (LI) is calculated to derive the likelihood (or probability) that an offer from an Identified Seller will best match the Buyer's project (P). In the preferred embodiment of the invention as depicted in FIG. 3, LI is derived from a weighted calculation of a relevancy index and a priority index. For example, LI can be calculated by multiplying respective factors or weights (e.g., 0.5, 0.5) to the relevancy index and the priority index, and then summing the resultant values.

The relevancy index preferably is derived from a number of sub-indices, including a preferred-seller index, a geographical-proximity index, a keyword-matching index, and a relevant-samples-of-work index. The priority index preferably is derived from a number of sub-indices, including a quality-assurance index, a preferred-seller popularity index, a proposal-history index, a seller-seniority index, a subscription-expiration index, and a pay-per-proposal submission index.

The Preferred-Seller Index assigns a score to the Identified Seller based on whether or not that Identified Seller is on the Buyer's preferred talent list. This list may be created by the Buyer over time for Sellers with whom it has worked and whose work product and/or service has been satisfactory. This list is stored and accessed as part of the buyer data in the Database 21. This index might comprise 30% of the relevancy index.

The Geographic-Proximity index assigns a score to the Identified Seller based on the geographic proximity of the Identified Seller to the Buyer. The geographical location for the Identified Seller and the Buyer can be stored and accessed as part of the data in the Database 21. This index might comprise 10% of the relevancy index.

The Keyword-Matching index assigns a score to the Identified Seller based on matching key words in the profile of the Identified Seller to key words pertaining to the project (P). The profile of the Identified Seller is maintained as seller data in the Database 21. The keywords pertaining to the project can be input (or selected) by the Buyer and/or automatically extracted from the requirements of the project (P) as maintained in the Database 21. This index might comprise 30% of the relevancy index.

The Relevant-Samples-of-Work index assigns a score to the Identified Seller based on samples of offers, services, products, etc. that the Identified Seller has added to his or her profile as maintained by the Database 21 and that is deemed relevant to the project (P). This index might comprise 30% of the relevancy index.

The Quality-Assurance index assigns a score to the Identified Seller based on a quality control process established by the marketplace to rate Sellers. For example, if an Identified Seller (or the profile of an Identified Seller) has not been approved by a quality control team in a specific market, then the Identified Seller might be assigned a lower score for this index. This index might comprise 10% of the priority index.

The Preferred-Seller-Popularity index assigns a score to the Identified Seller based on the number of Buyers in a given market that have selected a specific Seller and placed that Seller on their respective "preferred seller list." For example, the Preferred-Seller-Popularity index might range from 1%-100%, with one percentage point being awarded for each preferred seller list on which the Identified Seller has been placed. The preferred seller lists that contribute to this index can be constrained to particular Buyers, such as Buyers in the relevant industry or field that pertains to the project (P). This index might comprise 10% of the priority index.

The Proposal-History index assigns a score to the Identified Seller based on a grading, rating, or feedback system for the offers and proposals historically submitted, if any, by the Identified Seller. This information is maintained in the Database 21. This index might comprise 40% of the priority index.

The Seller-Seniority Index assigns a score to the Identified Seller based on the Identified Seller's seniority in the system and/or marketplace. This information is maintained in the Database 21. This index might comprise 20% of the priority index.

The Pay-Per-Proposal-Submission index assigns a score to the Identified Seller based on the amount of money the Identified Seller is willing to pay for submission of an offer. This information is maintained in the Database 21. This index might comprise 20% of the priority index.

In the above described embodiment of the invention, the relevancy and priority indices each comprise 50% of the LI. But numerous other indices and sub indices with different values and weighted characteristics can be developed and used with the present invention to accomplish the desired results depending on a Buyer's particular business and goals, and the particular talents and characteristics of the sellers in a given market. Other possible sub-indices include the similarity of a particular Identified Seller to other Identified Sellers that have been identified for a project and/or for prior similar projects; the number of requirements of the project that are met by the Identified Seller's particular profile; the number of offers that a seller has submitted during a period of time compared to the average number of offers submitted by other sellers; an Identified Seller's quoted price compared to the average of the quoted prices submitted by other sellers; the amount of money that a seller is willing to pay to the marketplace in order to earn the right to submit offers; the tier level of a seller in the marketplace; the historical expensiveness of a seller compared to the project's budget; and the seller's experience level.

As discussed above, a likelihood index table (LIT) stores LIs for a number of Identified Sellers. Each LI represents the likelihood that the corresponding seller will best match a Buyer's need for desired goods and/or services as dictated by the project (P). The likelihood index of a given seller is based on relevancy and priority indices generated for the given Identified Seller as described above in more detail. The LIT is preferably sorted according to the rank of the likelihood indices contained therein in order to efficiently identify the highest ranked Identified Sellers. The rank of an Identified Seller in the LIT reflects the Identified Seller's probability of satisfying the Buyer's need for goods and/or services relative to the other sellers in the LIT. Note that the likelihood indices of the LIT can also account for the level of activity of Sellers in the marketplace (in order to first invite more or less active Sellers) and/or account for other factors that the marketplace may consider (in order to increase or decrease the level of participation of individual Sellers).

After building the LIT, the system initiates a flow control process (FCP) to regulate the process and flow by which the Buyer receives offers from Identified Sellers. The FCP is intended to increase the Buyer's chances of finding the best Identified Seller for the project (P) at the beginning of the process. This is accomplished by allowing only a small number of the highest ranked Identified Sellers in the LIT to compete for the project early in the process. During this period of time, the Buyer can evaluate the offers presented by these highest ranked sellers without being bombarded with offers from other sellers. In short, the Identified Sellers most likely to get the project are allowed to compete for the project over a larger period of time without interference from numerous other sellers. If the Buyer does not select a Seller early in the process, then a larger number of lower ranked Identified Sellers are subsequently allowed to compete for the project (P).

The FCP operates over a number of processing cycles. In each processing cycle, the FCP calculates a number of Identified Sellers to classify as "invited." An Invited Seller is an Identified Seller that has been selected to submit one or more offers to the Buyer for the project (P).

Classification of an Identified Seller as "invited" can trigger the system to automatically perform various system tasks related to the project (P), such as:
  (1) notification to the Invited Seller that the Invited Seller has been selected to submit one or more offers to the Buyer (such notification can be carried out over the messaging interface of Seller Application component 17 or by other external messaging means such as telephone, fax, e-mail, SMS, IM, etc); and
  (2) notification to the Buyer of the Invited Seller (such notification can be carried out over the messaging interface of Buyer Application component 15 or by other external messaging means such as telephone, fax, e-mail, SMS, IM, etc).

Classification of an Identified Seller as "invited" can also trigger the system to enable actions and/or tasks to be performed by the Invited Seller and/or the Buyer with regard to the project (P), such as:
  (1) communication between the Invited Seller and Buyer (such communication can occur over a messaging interfaces of the Seller and Buyer Application components 15, 17 or via external messaging such as telephone, fax, e-mail, SMS, IM, etc);
  (2) submission of an offer from the Invited Seller to the Buyer (the offer can be stored in the Database 21 of the system and accessed by and/or presented to the Buyer by the Buyer Application component 15, or possibly communicated to the Buyer via external messaging such as telephone, fax, e-mail, SMS, IM, etc.);
  (3) communication of information related to an offer from the Invited Seller to the Buyer (the related information can be uploaded to and stored on the Database 21 by the Seller Application component 17 and accessed by and/or presented to the Buyer by the Buyer Application component 15, or possibly communicated to the Buyer via external messaging such as telephone, fax, e-mail, SMS, IM, etc.);
  (4) access to detailed information regarding the project (P) by the Invited Seller (the detailed information can be uploaded to and stored on the Database 21 by the Buyer Application component 15 and accessed by and/or presented to the Seller by the Seller Application component 17, or possibly communicated to the Invited Seller via external messaging such as telephone, fax, e-mail, SMS, IM, etc.); and
  (5) exchange of information between the Buyer and the Invited Seller as required (such information exchange can be carried out over the messaging interfaces of the Buyer Application component 15 and the Seller Application component 17, or possibly involve external messaging such as telephone, fax, e-mail, SMS, IM, etc.).

The number of new Invited Sellers for each process cycle can vary, and is preferably calculated based on a number of factors, including, but not limited to, the deadline of the project, the total number of Identified Sellers, the number of offers (A) that the Buyer wants for the project, the ratio of the total number of Invited Sellers overall versus the number of Invited Sellers that have actually submitted an offer, etc. For each processing cycle, the new Invited Sellers have the highest rank in the LIT for those Identified Sellers that have not already been classified as Invited Sellers. In other words, during each subsequent processing cycle, the FCP identifies new lower-ranked Identified Sellers as Invited Sellers.

At the end of each processing cycle, the FCP calculates the time period for the next processing cycle (if there is one) and continues to perform the processing for the next processing cycle. The calculation of the processing cycle times for the project is preferably based on a number of factors, including, but not limited to, the deadline of the project, the time left on the project to receive offers, the number of Identified Sellers, the ratio of Invited Sellers versus Invited Sellers that have submitted an offer, etc.

Figure 4B:
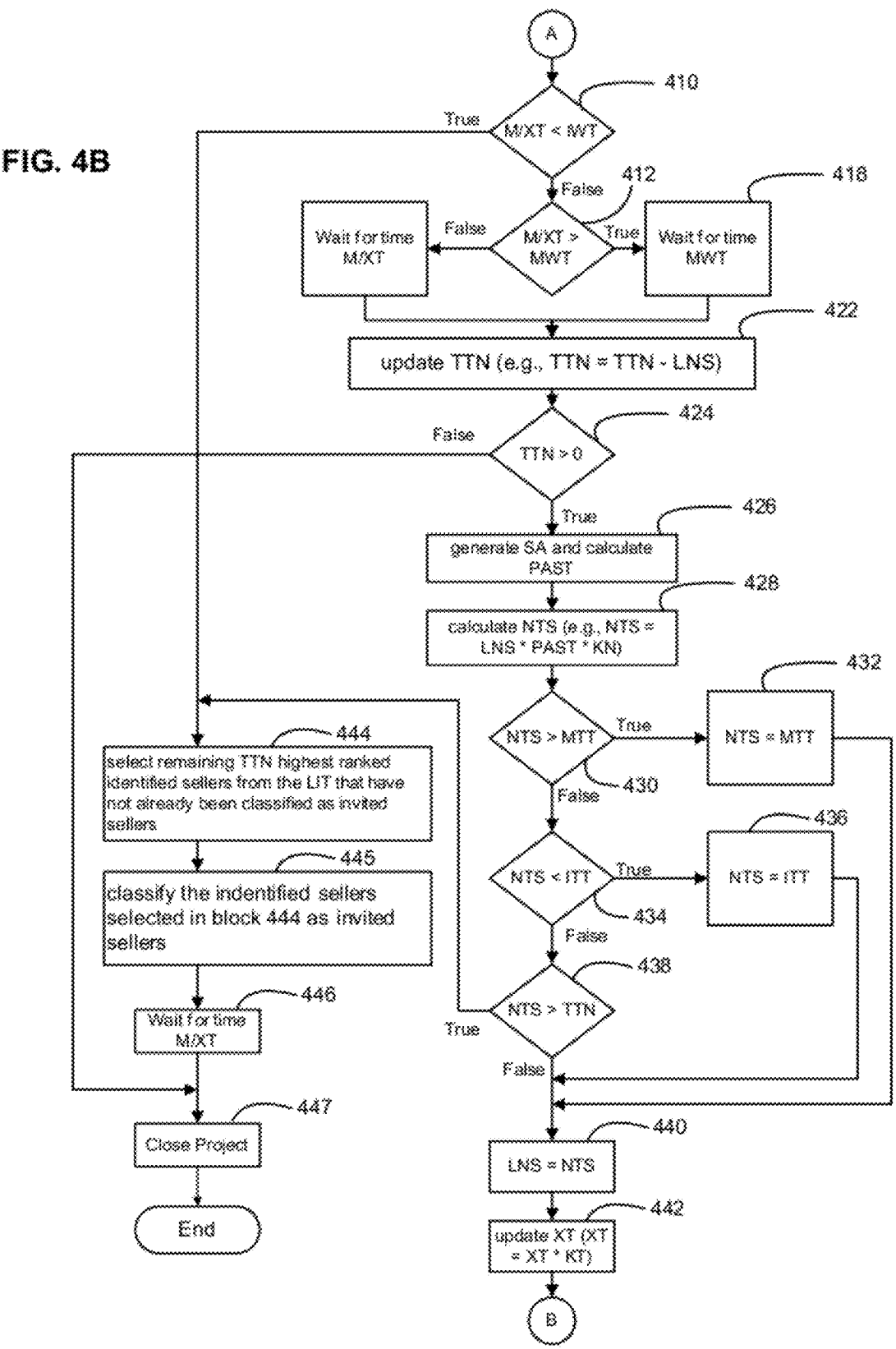

The FCP can be implemented in various ways depending on the needs of a business. An exemplary embodiment of the FCP is illustrated in FIGS. 4A and 4B, which begins in block 400 by defining a set of parameters utilized by the process as shown. In block 402, the process calculates the amount of time available to get offers (M). In the preferred embodiment, the calculation of M depends upon the needs of each individual business. For example, a business might want to receive 100% of all offers within the first 75% of the time period between the date that the project posts and the deadline, which would give the business 25% of the time before the deadline to do other things once it has selected a seller. Block 402 also initializes KT and XT, which are variables used to derive the processing cycle time over the cycles of the process. In the preferred embodiment, KT is a constant and XT is variable that is initialized to KT and updated each processing cycle (block 442). Block 402 also preferably initializes the following constants: the maximum processing cycle time (MWT), the minimum processing cycle time (IWT), the maximum number of Identified Sellers that can be classified as Invited Sellers in each processing cycle (MTT), and the minimum number of Identified Sellers that can be classified as Invited Sellers in each processing cycle (ITT).

In block 404, the process calculates the initial number of Invited Sellers (INS), which is preferably based on the number of offers (A) that the Buyer wants for the project, and a predetermined constant KA (e.g., INS=A*KA). The constant KA is typically higher than 1.0, and is set based on an anticipated response rate, as well as the number of cycles desired over the flow control process. Block 404 also initializes the number of Identified Sellers to classify as Invited Sellers in the current processing cycle (LNS) to INS (LNS=INS) and initializes the number of Identified Sellers in the LIT that have yet to be classified as Invited Sellers (TTN) as the number of Identified Sellers in the LIT.

The process then operates over a number of processing cycles (which are defined by blocks 406, 410, 412, 418, 420). During each processing cycle, the process classifies a number of Identified Sellers as Invited Sellers (blocks 406 and 408) and waits for a processing cycle time period. Classification of an Identified Seller as "invited" can trigger the system to automatically perform various system tasks related to the project as described above. Classification of an Identified Seller as "invited" can also trigger the system to enable actions and/or tasks to be performed by the Invited Seller and/or the Buyer with regard to the project as described above. The system can also monitor the number of offers the Buyer has received from Invited Sellers with respect to the project. After each processing cycle, the process updates the variable TTN, calculates the number of Identified Sellers to classify as Invited Sellers in the next processing cycle, and calculates the wait time for the next processing cycle (blocks 422 through 442) and then continues to the next processing cycle or performs the last processing cycle (blocks 444 to 447).

In block 406, the process selects the LNS highest ranked Identified Sellers from the LIT that are not already classified as "Invited Sellers." During the first cycle, that group would simply consist of the LNS highest ranked Identified Sellers on the LIT. During the second cycle, that group would consist of the next LNS highest ranked Identified Sellers, etc.

In block 408, the process classifies the Identified Sellers selected in block 406 as "Invited Sellers."

In block 410, the process evaluates whether the amount of time (M) to get offers divided by variable (XT) is less than or greater than the minimum amount of time (IWT) for processing cycles. Variable (XT) increases each cycle by the preset multiple (KT), which makes the ratio (M/XT) approach zero for each subsequent processing cycle. If this ratio becomes less than the minimum processing cycle time (IWT), the FCP continues to the path of blocks 444-447 to carry out the last processing cycle as described below. If this ratio is greater than the minimum processing cycle time (IWT), the FCP proceeds to block 412.

In block 412, if ((M/XT)>MWT), the FCP waits for the time period specified by constant MWT (block 418). If ((M/XT)<MWT), the FCP waits for the time period (M/XT) (block 420). These steps ensure that the processing cycle time does not exceed the designated maximum processing cycle time MWT. At the end of either block 418 or 420, the process proceeds to block 422.

In block 422, the process decreases the value of TTN by the value of LNS (e.g., TTN=TTN−LNS). TTN, which is the total number of Identified Sellers in the LIT that have yet to be classified as Invited Sellers, decreases each cycle as LNS new Identified Sellers are become invited.

In block 424, the process evaluates whether TTN is greater than zero. If this condition is false (TTN=0), then there are no Identified Sellers in the LIT that have not yet been classified as Invited Sellers, and the process continues to block 447 to terminate the invitation cycle processing. If the condition of block 412 is determined to be true (TTN>0), the FCP continues to block 426 and 428. In block 626, the FCP determines the total number of offers submitted from Invited Sellers (SA) and calculates the percentage of Invited Sellers that have yet to submit an offer (PAST). In block 428, the FCP calculates the number (NTS) of Identified Sellers to classify as Invited Sellers in the next processing cycle, preferably based on a configurable constant (KN) and the percentage of Invited Sellers that have yet to submit an offer (PAST) (e.g., NTS=(LNS)*(PAST)*(KN)).

In block 430, the FCP evaluates whether NTS (as calculated in block 428) is greater than the preset maximum number of Identified Sellers that can be enabled during each processing cycle (MTT). If so, the FCP sets NTS equal to MTT (block 432) and proceeds to block 440. In block 434, the FCP evaluates whether NTS (as calculated in block 428) is less than the preset minimum number of Identified Sellers that can be enabled during each processing cycle (ITT). If so, the FCP sets NTS equal to ITT (block 436) and proceeds to block 440. The operations of blocks 430-436 ensure that the number of Identified Sellers classified as Invited Sellers in each processing cycle stays between a preset minimum and maximum number and thus will not receive too few or too many offers during any given processing cycle.

In block 438, the FCP evaluates whether the number of calculated Identified Sellers to classify as Invited Sellers in the next processing cycle (NTS) is greater than the number of Identified Sellers in the LIT that have yet to be classified as Invited Sellers (TTN).

Figure 4C:
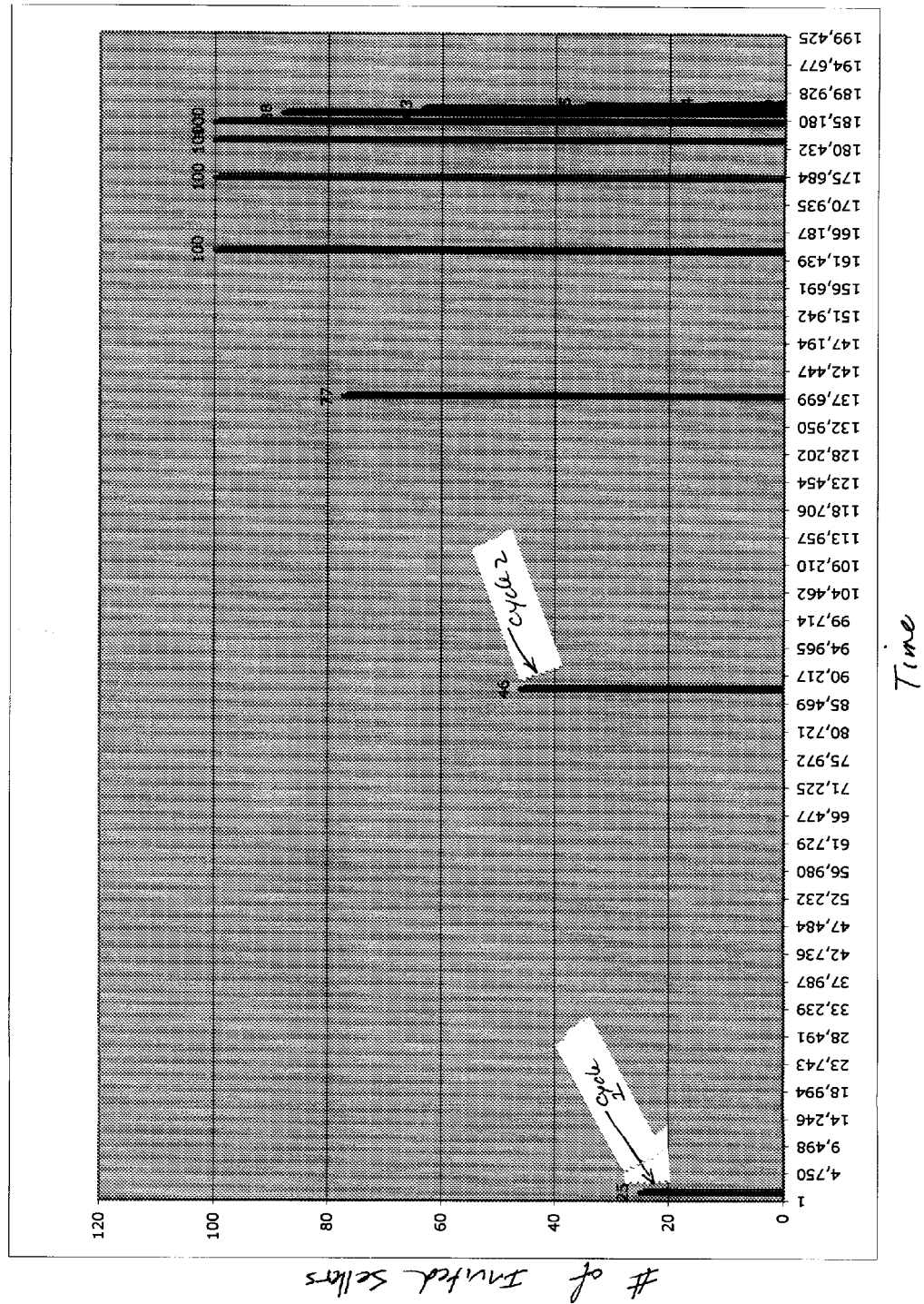
FIG. 4C is a graph depicting the number of Invited Sellers classified over each one of a number of processing cycles as part of the flow control process of FIGS. 4A and 4B for an exemplary project.

If in block 438 (TS>TTN) is false, the FCP continues to blocks 440 and 442. In block 440, the FCP sets LNS equal to NTS. In block 442, the FCP updates variable XT, preferably based on a predetermined constant used to derive processing cycle time (KT) (XT=XT*KT). The operations then loop back to block 406 for the next processing cycle. Note that the change to (XT) will cause the time period for the next cycle to change. Since the initial value of (XT) is (KT), the time period for each subsequent processing cycle changes by a factor of 1/(KT). The time of each processing cycle decreases as a function of $M/(XT)^n$ where n=the processing cycle number. FIG. 4C depicts the number of Invited Sellers classified over each one of a number of processing cycles as part of the flow control process described above for an exemplary project. The time for the project extends along the X axis. The Y axis depicts the number of Invited Sellers. The data lines correspond to the processing cycles of the process. The relative position of a given data line along the X axis with respect to the previous data line indicates the duration of the corresponding processing cycle. The height of the data line indicates the number of Invited Sellers classified during the corresponding processing cycle.

If in block 438 (TS>TTN) is true, the FCP continues to the path of blocks 444-447 to carry out the last processing cycle. In blocks 444, the FCP selects the remaining Identified Sellers in the LIT that have yet to be classified as Invited Sellers. In block 445, the Identified Sellers selected in block 444 are classified as Invited Sellers. In block 446, the FCP process waits for a time M/XT. In block 447, the invitation cycle processing stops and the FCP ends.

There have been described and illustrated herein several embodiments of a system, methodology, and apparatus for matching sellers to a buyer over a network and for managing related information. While particular embodiments of the invention have been described, it is not intended that the invention be limited thereto, as it is intended that the invention be as broad in scope as the art will allow and that the specification be read likewise. Thus, while particular application server architectures have been disclosed, it will be appreciated that other architectures for web-based services can be used as well. In addition, while particular schema and data have been disclosed for matching voice over talent to buyers, it will be understood that the matching logic, systems and apparatus as described herein can be used for other applications, including, and not by way of limitation, systems for matching employers to potential employees, systems for matching corporate buyers to potential vendors and other suitable reverse auction processes. Moreover, while particular methodologies have been disclosed in reference to the generation of the likelihood index table and flow control process, it will be appreciated that other methodologies could be used as well. For example, the number of sellers classified as "Invited Sellers" in a given processing cycle of the flow control process can be constant over the processing cycles (such as one per cycle) and the time duration of the processing cycles can vary depending on the percentage of Invited Sellers that have yet to submit an offer (PAST). It will therefore be appreciated by those skilled in the art that yet other modifications could be made to the provided invention without deviating from its spirit and scope as claimed.

What is claimed is:

1. A computer-implemented method executed on a data processing system, the method for facilitating a transaction between a buyer and one of a number of sellers, the transaction related to a project specified by the buyer, the method comprising:
   i) on the data processing system, defining a time period for the transaction;
   ii) on the data processing system, identifying a set of sellers represented by data stored in a database of the data processing system;
   iii) on the data processing system, generating data associated with the set of sellers of ii), wherein the data associated with a given seller is independent of any information specified by the given seller particularly for the project;
   iv) on the data processing system, for each given processing cycle over a number of successive processing cycles that occur during the time period for the transaction of i), automatically classifying at least one seller of the set of sellers of ii) as belonging to a particular type associated with the project, wherein the automatic classification of iv) is based upon the data generated in iii) and irrespective of any information specified by sellers particularly for the project, and wherein the number of sellers classified as belonging to the particular type in iv) automatically increases incrementally over the number of successive processing cycles; and
   v) on the data processing system, in each given processing cycle, automatically enabling submission of at least one offer related to the project by the sellers classified as belonging to the particular type in iv), whereby the at least one offer can be accepted by the buyer as part of the transaction related to project.

2. A method according to claim 1, wherein:
the duration of each given processing cycle varies over the number of successive processing cycles.

3. A method according to claim 2, wherein:
the duration of each given processing cycle is derived from a time period specified by the buyer.

4. A method according to claim 3, wherein:
the duration of each given processing cycle is derived from a predetermined constant that results in exponential reduction of said durations.

5. A method according to claim 1, wherein:
the number of sellers classified as belonging to the particular type in each given processing cycle in iv) depends upon a number of offers that are submitted by sellers classified as belonging to the particular type and received by the buyer for the project in previous processing cycles.

6. A method according to claim 1, wherein:
the number of sellers classified as belonging to the particular type in an initial processing cycle depends on a number of offers the buyer wishes to receive as dictated by input from the buyer.

7. A method according to claim 1, wherein:
the number of sellers classified as belonging to the particular type in each given processing cycle is constant over the processing cycles.

8. A method according to claim 1, further comprising:
on the data processing system, storing offers submitted by the sellers of the particular type and related information in a database for access by the buyer.

9. A method according to claim 8, wherein:
the information related to the offers includes multimedia files related to the offers.

10. A method according to claim 1, further comprising:
on the data processing system, enabling sellers classified as belonging to the particular type to access detailed information related to the project.

11. A method according to claim 1, further comprising:
on the data processing system, enabling communication between the sellers classified as belonging to the particular type and the buyer.

12. A method according to claim 1, further comprising:
automatically notifying the sellers of their classification to the particular type.

13. A method according to claim 1, further comprising:
automatically notifying the buyer of the sellers classified as belonging to the particular type.

14. A method according to claim 1, wherein:
the data associated with the set of sellers includes likelihood indices for the set of sellers, wherein the likelihood index associated with a given seller characterizes likelihood that the given seller will match the buyer's needs for the project.

15. A method according to claim 14, further comprising:
on the data processing system, automatically ranking the sellers of the set according to the corresponding likelihood indices;
wherein the automatic classification of iv) selects higher ranked sellers before lower ranked sellers.

16. A method according to claim 15, wherein:
the likelihood index for a seller is derived from a number of index calculations.

17. A method according to claim 16, wherein:
said index calculations include a group of relevancy sub-indices and a group of priority subindicies.

18. A method according to claim 17, wherein:
said relevancy sub indices include at least one of: a preferred-seller index, a geographical-proximity index, a keyword-matching index, and a relevant-samples-of-work index; and
said priority subindices include at least of: a quality-assurance index, a preferred-seller popularity index, a proposal-history index, a seller-seniority index, and a pay-per-proposal submission index.

19. A method according to claim 1, wherein:
the data associated with the set of sellers includes profile data of the sellers, and the automatic classification of iv) matches requirements of the project as specified by the buyer to the profile data of sellers.

20. A method according to claim 19, wherein:
the automatic classification of iv) involves similarity analysis with respect to the requirements of the project and the profile data of sellers.

21. A data processing system for facilitating a transaction between a buyer and one of a number of sellers, the transaction related to a project, the data processing system comprising:
a database;
first means for interacting with a buyer over a communication network to specify a project and storing data related to the project in the database;
second means for interacting with a number of sellers over the communication network and storing data related to the sellers in the database, wherein certain data associated with a given seller is independent of any information specified by the given seller particularly for the project;
third means for defining a time period for the transaction;
fourth means for performing an automated process for identifying a set of sellers represented by the data stored in a database;
fifth means for automatically classifying at least one seller of the set of sellers as belonging to a particular type associated with the project over a number of successive processing cycles that occur during the time period for the transaction, wherein the automatic classification of the fifth means is based upon the certain data of the sellers stored in the database and irrespective of any information specified by sellers particularly for the project, and wherein the number of sellers classified as belonging to the particular type by the fifth means automatically increases incrementally over the number of successive processing cycles; and
sixth means that automatically enables submission of at least one offer related to the project by the sellers classified as belonging to the particular type, whereby the at least one offer can be accepted by the buyer as part of the transaction related to project.

22. A system according to claim 21, wherein:
the first, second, third, fourth, fifth and sixth means are realized by an application server operably coupled to the Internet.

\* \* \* \* \*